United States Patent
Peterson et al.

(10) Patent No.: US 9,544,036 B2
(45) Date of Patent: Jan. 10, 2017

(54) BEAM FORMING FOR REFERENCE SIGNALS USING AN ANTENNA ARRANGEMENT

(71) Applicant: TELEFONAKTIEBOLAGET L M ERICSSON (PUBL), Stockholm (SE)

(72) Inventors: Sven Peterson, Sävedalen (SE); Fredrik Athley, Kullavik (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 159 days.

(21) Appl. No.: 14/358,020

(22) PCT Filed: May 8, 2014

(86) PCT No.: PCT/EP2014/059444
§ 371 (c)(1),
(2) Date: May 13, 2014

(87) PCT Pub. No.: WO2015/169369
PCT Pub. Date: Nov. 12, 2015

(65) Prior Publication Data
US 2015/0326297 A1    Nov. 12, 2015

(51) Int. Cl.
*H04B 7/06* (2006.01)
*H01Q 21/06* (2006.01)
(Continued)

(52) U.S. Cl.
CPC .......... *H04B 7/0617* (2013.01); *H01Q 21/061* (2013.01); *H04B 7/0619* (2013.01);
(Continued)

(58) Field of Classification Search
None
See application file for complete search history.

(56) References Cited

U.S. PATENT DOCUMENTS

2003/0162566 A1   8/2003   Shapira et al.
2004/0136342 A1   7/2004   Pedersen et al.
(Continued)

FOREIGN PATENT DOCUMENTS

EP    2685755 A1    1/2014
WO    2013181850 A1    12/2013

OTHER PUBLICATIONS

International Search Report of the International Searching Authority dated Jul. 23, 2014, in International Application No. PCT/EP2014/059444, 5 pages.

*Primary Examiner* — Kwang B Yao
*Assistant Examiner* — Adam Duda
(74) *Attorney, Agent, or Firm* — Rothwell, Figg, Ernst & Manbeck, P.C.

(57) ABSTRACT

There is provided beam forming using an antenna array configured to transmit across an angular sector. A first set of virtual antenna ports is determined by a mapping of physical antenna ports of the antenna array, the first set of virtual antenna ports defining a beam pattern. A first set of reference signals for acquiring channel state information is transmitted over the first set of virtual antenna ports. Angular information about a wireless transceiver device receiving the transmitted first set of reference signals is acquired. The beam pattern is adapted based on an accuracy of the angular information and/or the angular information itself.

27 Claims, 5 Drawing Sheets

(51) Int. Cl.
*H04L 5/00* (2006.01)
*H04B 7/08* (2006.01)
*H04W 16/28* (2009.01)

(52) U.S. Cl.
CPC ......... *H04B 7/0626* (2013.01); *H04B 7/0684* (2013.01); *H04B 7/086* (2013.01); *H04L 5/0023* (2013.01); *H04L 5/0048* (2013.01); *H04W 16/28* (2013.01)

(56) References Cited

U.S. PATENT DOCUMENTS

2013/0229980 A1   9/2013   Wernersson et al.
2013/0235807 A1*  9/2013   Lee ..................... H04W 16/28
                                                        370/329

\* cited by examiner

BEAM FORMING FOR REFERENCE SIGNALS USING AN ANTENNA ARRANGEMENT

CROSS REFERENCE TO RELATED APPLICATION(S)

This application is a 35 U.S.C. §371 National Phase Entry Application from PCT/EP2014/059444, filed May 8, 2014, designating the United States, the disclosure of which is incorporated herein in its entirety by reference.

TECHNICAL FIELD

Embodiments presented herein relate to beam forming, and particularly a method, an antenna arrangement, and a computer program for beam forming.

BACKGROUND

In communications networks, it may be challenging to obtain good performance and capacity for a given communications protocol, its parameters and the physical environment in which the communications network is deployed.

One component of wireless communications networks where it may be challenging to obtain good performance and capacity is the antennas of network nodes configured for wireless communications; either to/from another network node, and/or to/from a wireless user terminal.

For example, multi-antenna transmission techniques are used in several wireless communication standards, e.g. the Long Term Evolution (LTE) telecommunications standard of the 3rd Generation Partnership Project (3GPP), in order to increase system capacity and coverage. A particular transmission mode (TM) is codebook-based precoding in which the radio base station (such as an evolved Node B, or eNB) of the network transmits one or several beam formed data streams to the wireless end-user terminals (denoted user equipment, or UE). The beam forming weights are selected from a standardized codebook based on recommendations transmitted from the UE. In order for the UE to be able to recommend beam forming weights the radio base station first transmits pre-determined reference signals which are used by the UE to estimate the complex channel matrix between the radio base station and UE. This estimate may then be used to determine which weights in the codebook that for the UE will result in the best performance for the current channel state. Since there is only a finite number of eligible beam forming weights (as dictated by the codebook), only an index needs to be transmitted back from the UE to the radio base station. This index is referred to as a precoding matrix indicator (PMI). The radio base station may then select to transmit user data with the precoding matrix recommended by the UE, or with some other precoding matrix. For example, in transmission mode 4 (TM4) the radio base station may use another precoding matrix in the codebook, while in transmission mode 9 (TM9) there is no restriction on what precoding matrix for the radio base station to use. In the latter case, the codebook is only used to feedback quantized channel state information (CSI), for example acquired from channel state reference signals (CSI-RS), whilst the demodulation of user data relies on precoded user-specific reference signals. For this reason, TM9 is sometimes referred to as non-codebook-based precoding.

Further, transmission mode 9 (TM9), defined in LTE release 10, is designed for up to eight antennas. The structure of the LTE release 10 codebook is specifically suited for a four column dual polarized uniform linear array antenna. With such types of antennas the beam forming gain, for example expressed in terms of antenna gain, is typically the same as the number of columns, i.e., a factor four. The beam forming gain is hence limited to be in the order of the number of CSI-RS ports; in case of dual polarized antennas typically half this number.

Hence, there is a need for improved beam forming.

SUMMARY

An object of embodiments herein is to provide efficient beam forming.

According to a first aspect there is presented a method for beam forming using an antenna array configured to transmit across an angular sector. The method comprises determining a first set of virtual antenna ports by a mapping of physical antenna ports of the antenna array, the first set of virtual antenna ports defining a beam pattern. The method comprises transmitting a first set of reference signals for acquiring channel state information over the first set of virtual antenna ports. The method comprises acquiring angular information about a wireless transceiver device receiving the transmitted first set of reference signals. The method comprises adapting the beam pattern based on an accuracy of the angular information and/or the angular information itself.

Advantageously this provides efficient beam forming.

Advantageously this enables high signal and/or low interference power, resulting in improved spatial reuse and giving high spectral efficiency.

Advantageously, this enables the spatial resolution from beam forming, for example via TM9 or transmission mode 10 (TM10), to be improved compared to a state of the art implementation. The improved spatial resolution is obtained by means of adaptively adjust beam port characteristics for the ports over which reference signals are transmitted to the wireless transceiver device(s) of interest.

According to embodiments some properties that may be adapted include, but are not limited to: beam width or shape, beam pointing direction, and/or phase center location or radiation center of the virtual antenna ports.

According to an embodiment the method further comprises determining at least one further set of virtual antenna ports by respective further mappings of physical antenna ports of the antenna array, each at least one further set of virtual antenna ports defining a respective beam pattern, and wherein each set of virtual antenna ports is associated with a respective set of reference signals for channel state information.

According to an embodiment the method further comprises simultaneously transmitting the first set of reference signals for acquiring channel state information over the first set of virtual antenna ports, and the at least one further set of reference signals for acquiring channel state information over the at least one further set of virtual antenna ports.

Advantageously this enables a large number of antenna ports to be simultaneously used for transmitting reference signals.

Advantageously this enables denser sampling in spatial domain in the acquisition of possible response signals to the thus transmitted reference signals, thereby enabling higher beam forming gain, for example in subsequent data transmission.

According to a second aspect there is provided an antenna arrangement for beam forming using an antenna array configured to transmit across an angular sector. The antenna arrangement comprises a processing unit. The processing unit is configured to determine a first set of virtual antenna ports by a mapping of physical antenna ports of the antenna array, the first set of virtual antenna ports defining a beam pattern. The processing unit is configured to cause the antenna array to transmit a first set of reference signals for acquiring channel state information over the first set of virtual antenna ports. The processing unit is configured to acquire angular information about a wireless transceiver device receiving the transmitted first set of reference signals. The processing unit is configured to adapt the beam pattern based on an accuracy of the angular information and/or the angular information itself.

According to a third aspect there is presented a network node comprising an antenna arrangement according to the second aspect.

According to a fourth aspect there is presented a wireless terminal comprising an antenna arrangement according to the second aspect.

According to a fifth aspect there is presented a computer program for beam forming, the computer program comprising computer program code which, when run on a processing unit, causes the processing unit to perform a method according to the first aspect.

According to a sixth aspect there is presented a computer program product comprising a computer program according to the fifth aspect and a computer readable means on which the computer program is stored.

It is to be noted that any feature of the first, second, third, fourth, fifth and sixth aspects may be applied to any other aspect, wherever appropriate. Likewise, any advantage of the first aspect may equally apply to the second, third, fourth, fifth, and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step illustrated by dashed lines should be regarded as optional.

In general terms, the codebooks specified in the Long Term Evolutions (LTE) telecommunications standards have been designed for being used with one-dimensional (1-D) antenna arrays, typically uniform linear arrays. As noted above, the maximum number of antenna ports in the LTE release 10 codebook is eight. This puts a limit on the angular resolution in the CSI acquisition and the beam forming gain that can be achieved.

Transmission mode 9 (TM9), defined in LTE release 10, is designed for up to eight antennas. The structure of the LTE release 10 codebook is specifically suited for a four column dual polarized uniform linear array antenna. With such types of antennas the beam forming gain, for example expressed in terms of antenna gain, is typically the same as the number of columns, i.e., a factor four. The beam forming gain is hence limited to be in the order of the number of CSI-RS ports; in case of dual polarized antennas typically half this number.

The embodiments disclosed herein relate to improved beam forming. In order to obtain such beam forming there is provided an antenna arrangement, a method performed by a processing unit, a computer program comprising code, for example in the form of a computer program product, that when run on a processing unit, causes the processing unit to perform the method.

Figure 1:
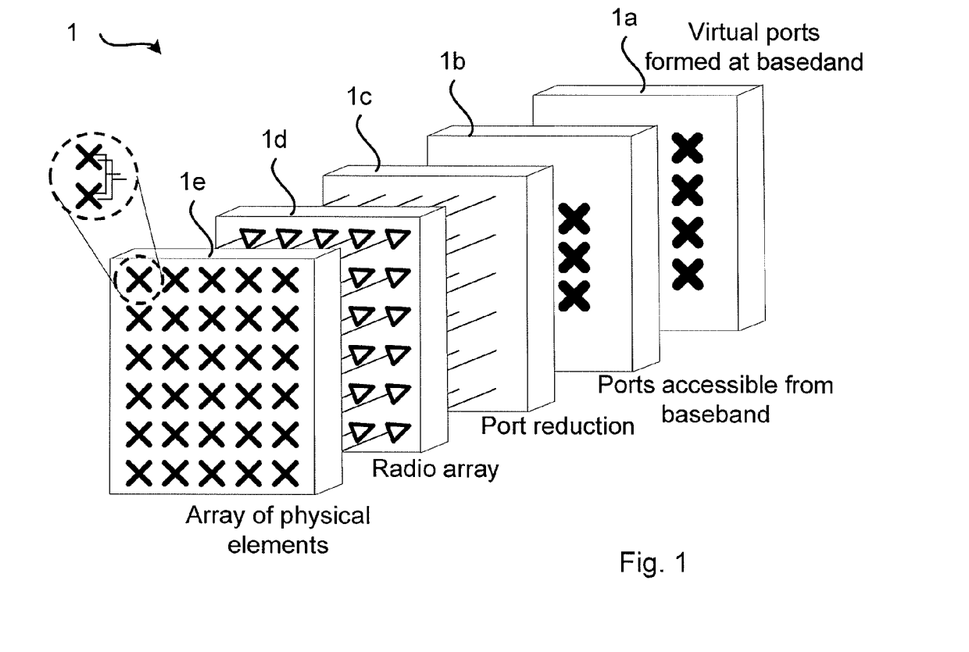
FIGS. 1 to 3 are schematic diagrams illustrating different aspects of antenna arrays according to embodiments.

FIG. 1 is a schematic block diagram illustrating an example architecture of an antenna array 1 for which embodiments presented herein can be applied. The antenna array 1 may be an N1-by-N2 two-dimensional antenna array, where N1>1 and N2>1. However, although illustrating such a two dimensional antenna array in FIG. 1, the herein disclosed embodiments are also applicable for a one dimensional antenna array. The antenna front end comprises an array 1*e* of physical antenna elements where each antenna element may be a subarray of several radiating antenna elements connected via a feed network to one physical antenna port (per polarization) for each physical element. Each physical antenna port is connected to a radio chain as comprised in a radio array 1*d*. The number of antenna ports in block 1*b* accessible to baseband signal processing may be reduced via a port reduction block 1*c* that creates new antenna ports that are (linear) combinations of the input antenna ports. In the baseband signal processing block 1*a* virtual antenna ports may be created by matrix multiplications. These virtual antenna ports may be of different type. For example, in LTE they may for a radio base station be common reference signals (CRS) at ports 0-3, channel state information reference signals (CSI-RS) at port 15-22, and UE-specific reference signals at ports 7-14. In some implementations one or several blocks of the in the antenna array 1 in FIG. 1 may be removed.

Figure 3:
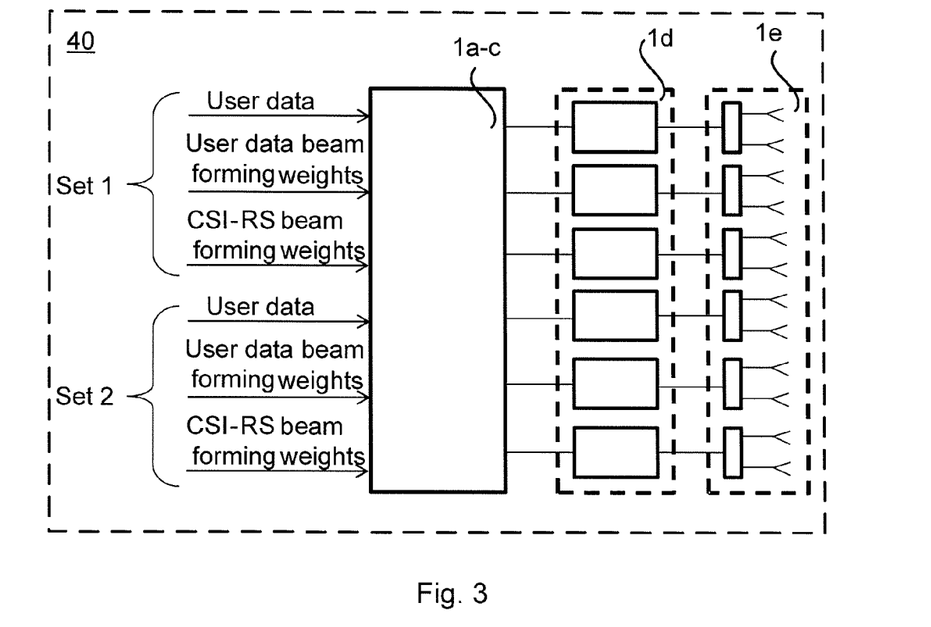

FIG. 3 is a schematic block diagram illustrating a possible implementation of the antenna array 1 of FIG. 1. The antenna array 1 may be part of an antenna arrangement 40. The antenna array 1 comprises a beam former comprising blocks 1a, 1b, 1c of FIG. 1, a radio array 1d and a physical antenna array 1e. The beam former 1a-c is configured to receive user data, beam forming weights for the user data, and beam forming weights for reference signals, such as CSI-RS. The beam former 1a-c may be configured to receive one set of user data, beam forming weights for the user data, and beam forming weights for reference signals. However, as will be further disclosed below, the beam former 1a-c may be configured to receive at least two sets (in FIG. 3 schematically illustrated by Set 1 and Set 2, respectively) of user data, beam forming weights for the user data, and beam forming weights for reference signals. The same CSI-RS information can be used to form several weight vectors, each one used for transmission of one layer.

Figure 4A:
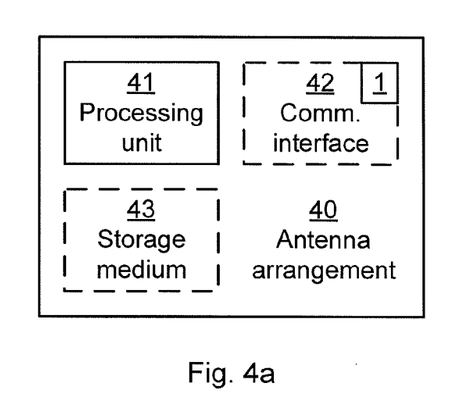
FIG. 4*a* is a block diagram showing functional units of an antenna arrangement according to an embodiment.

FIG. 4a schematically illustrates, in terms of a number of functional units, the components of an antenna arrangement 40 according to an embodiment. A processing unit 41 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 70 (as in FIG. 7), e.g. in the form of a storage medium 43. If implemented as an ASIC (or an FPGA) the processing unit 41 may by itself implement such instructions. Thus the processing unit 41 is thereby arranged to execute methods as herein disclosed. The storage medium 43 may also comprise persistent storage, which, for example, can be any single one or combination of magnetic memory, optical memory, solid state memory or even remotely mounted memory. The antenna arrangement 40 may further comprise a communications interface 42 for communications with radio transceiver devices, such as network nodes 51 and wireless terminals 61. As such the communications interface 42 may comprise one or more transmitters and receivers, comprising analogue and digital components and an antenna array 1 for radio communications. The processing unit 41 controls the general operation of the antenna arrangement 40 e.g. by sending data and control signals to the communications interface 42 and the storage medium 43, by receiving data and reports from the communications interface 42, and by retrieving data and instructions from the storage medium 43. Other components, as well as the related functionality, of the antenna arrangement 40 are omitted in order not to obscure the concepts presented herein.

Figure 4B:
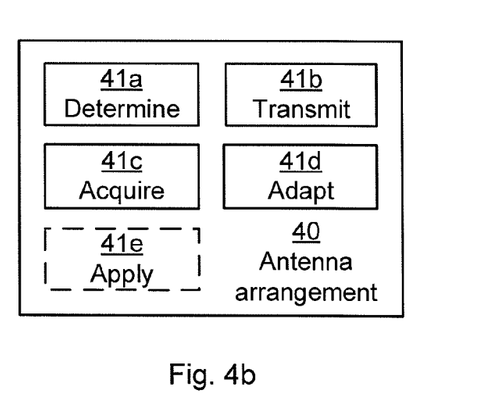
FIG. 4*b* is a block diagram showing functional modules of an antenna arrangement according to an embodiment.

FIG. 4b schematically illustrates, in terms of a number of functional modules, the components of an antenna arrangement 40 according to an embodiment. The antenna arrangement 4 of FIG. 4b comprises a determine module 41a, a transmit module 41b, an acquire module 41c, and an adapt module 41d. The antenna arrangement 40 of FIG. 4b may further comprises a number of optional functional modules, such as an apply module 41e. The functionality of each functional module 41a-e will be further disclosed below in the context of which the functional modules 41a-e may be used. In general terms, each functional module 41a-e may be implemented in hardware or in software. The processing unit 41 may thus be arranged to from the storage medium 43 fetch instructions as provided by a functional module 41a-e and to execute these instructions, thereby performing any steps as will be disclosed hereinafter.

Figure 5:
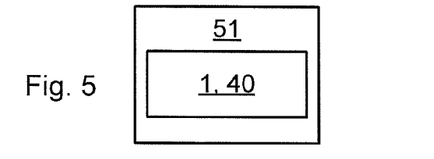
FIG. 5 schematically illustrates a network node comprising an antenna arrangement according to embodiments.
Figure 6:
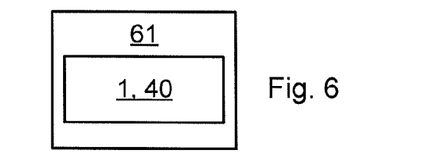
FIG. 6 schematically illustrates a wireless terminal comprising an antenna arrangement according to embodiments.

The antenna array 1 and/or the antenna arrangement 40 may be provided as integrated circuits, as standalone devices or as a part of a further device. For example, the antenna array 1 and/or antenna arrangement 40 may be provided in a radio transceiver device, such as in a network node 51 and/or a wireless terminal 61. FIG. 5 illustrates a network node 51 comprising at least one antenna array 1 and/or antenna arrangement 40 as herein disclosed. The network node 51 may be a BTS, a NodeB, an eNB, a repeater, a backhaul node, or the like. FIG. 6 illustrates a wireless terminal 61 comprising at least one antenna array 1 and/or antenna arrangement 40 as herein disclosed. The wireless terminal 61 may be a user equipment (UE), a mobile phone, a tablet computer, a laptop computer, etc. or the like.

The antenna array 1 and/or antenna arrangement 40 may be provided as an integral part of the further device. That is, the components of the antenna array 1 and/or antenna arrangement 40 may be integrated with other components of the further device; some components of the further device and the antenna array 1 and/or antenna arrangement 40 may be shared. For example, if the further device as such comprises a processing unit, this processing unit may be arranged to perform the actions of the processing unit 41 associated with the antenna arrangement 40. Alternatively the antenna array 1 and/or antenna arrangement 40 may be provided as separate units in the further device.

Figures 7, 8, 9:
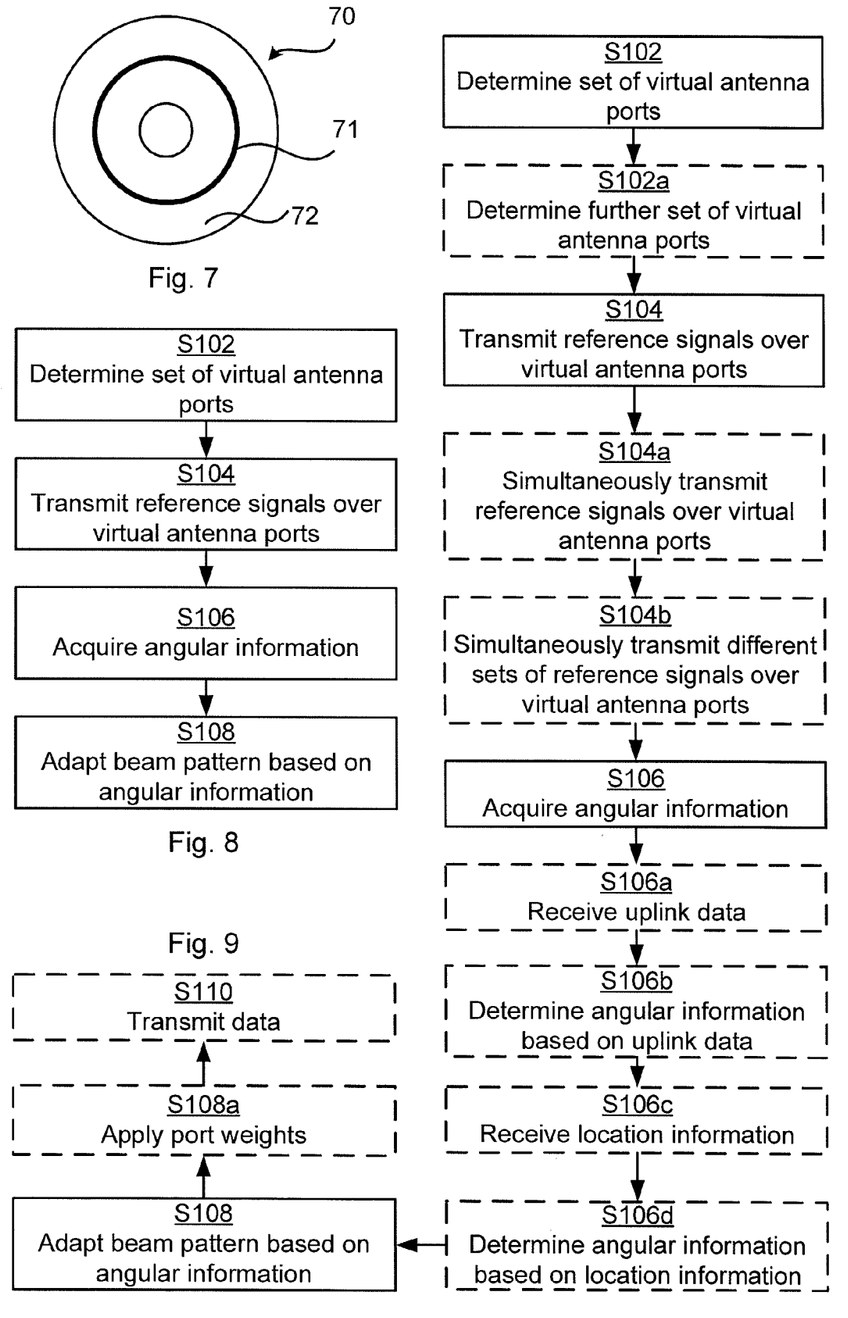
FIG. 7 schematically illustrates a computer program product according to an embodiment.
FIGS. 8 and 9 are flowcharts of methods according to embodiments.

FIGS. 8 and 9 are flow chart illustrating embodiments of methods for beam forming. The methods are performed by the processing unit 41. The methods are advantageously provided as computer programs 71. FIG. 7 shows one example of a computer program product 70 comprising computer readable means 72. On this computer readable means 72, a computer program 71 can be stored, which computer program 71 can cause the processing unit 41 and thereto operatively coupled entities and devices, such as the communications interface 42 (and hence the antenna array 1) and the storage medium 43, to execute methods according to embodiments described herein. The computer program 71 and/or computer program product 70 may thus provide means for performing any steps as herein disclosed.

In the example of FIG. 7, the computer program product 70 is illustrated as an optical disc, such as a CD (compact disc) or a DVD (digital versatile disc) or a Blu-Ray disc. The computer program product 70 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 71 is here schematically shown as a track on the depicted optical disk, the computer program 71 can be stored in any way which is suitable for the computer program product 70.

Reference is now made to FIG. 8 illustrating a method for beam forming using an antenna array 1 according to an embodiment.

The antenna array 1 is configured to transmit across an angular sector. Reference signals are to be transmitted using the antenna array 1. In order to do so, virtual antenna ports for the reference signals are determined. The method comprises in a step S102 determining a first set of virtual antenna ports. The first set of virtual antenna ports is determined by a mapping of physical antenna ports of the antenna array 1.

The first set of virtual antenna ports defines a beam pattern. The processing unit 41 may be configured to perform step S102.

The method comprises in a step S104 transmitting a first set of reference signals for acquiring channel state information over the first set of virtual antenna ports. The processing unit 41 may be configured to cause the antenna array 1 to perform step S104.

The first set of reference signals is intended to be received by at least one wireless transceiver device. The beam pattern defined by the first set of virtual antenna ports is to be adapted to the geographical relation between the antenna array 1 and/or antenna arrangement 40 and the wireless transceiver device. The method therefore comprises a step S106 of acquiring angular information about at least one wireless transceiver device intended to receive the transmitted first set of reference signals. The processing unit 41 may be configured to perform step S106. Different examples of such angular information and how it may be acquired will be provided below.

Specifically, information about the accuracy of the angular information is used to adapt the beam pattern. The method further comprises a step S108 of adapting the beam pattern (to the wireless transceiver device) or beam patterns (in case of several wireless transceiver devices) based on an accuracy of the angular information and/or the angular information itself. The processing unit 41 may be configured to perform step S108.

For example, antenna beam ports over which reference signals, such as CSI-RS, are transmitted may be defined per wireless transceiver device, or groups of wireless transceiver device (see, below), in an adaptive fashion. This enables the resolution of the antenna array to be improved compared to when reference signals are applied directly on (physical) antenna ports.

Figure 2:
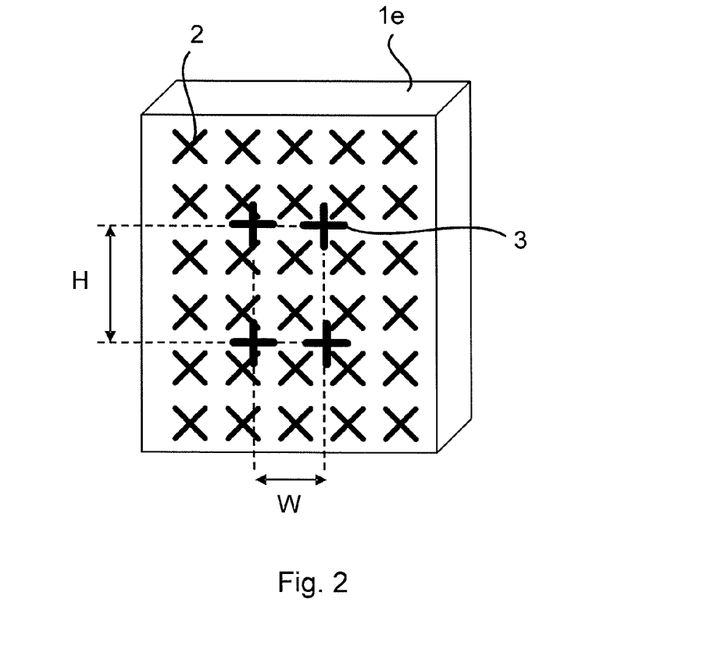

Each virtual antenna port may be regarded as a mapping of all or a subset of the physical antenna elements such that the desired beam characteristics are achieved in the adaptation in step S108. FIG. 2 schematically illustrates phase center positions and phase center separations of virtual antenna ports 3 according to an embodiment. The vertical phase center separation has a height H and the horizontal phase center separation has a width W. Also the physical antenna elements 2 are illustrated for reference. The virtual antenna ports 3 may be created by an antenna architecture such as the one in FIG. 1. In FIG. 2 the virtual antenna ports form a 2-by-2 antenna array. FIG. 2 shows for sake of visibility only one set of virtual antenna ports used for transmission of reference signals. However, there may be multiple sets of virtual antenna ports, where each set may be associated with unique characteristics regarding phase center location and beam properties such as beam width and direction, both in two dimensions.

Figure 10:
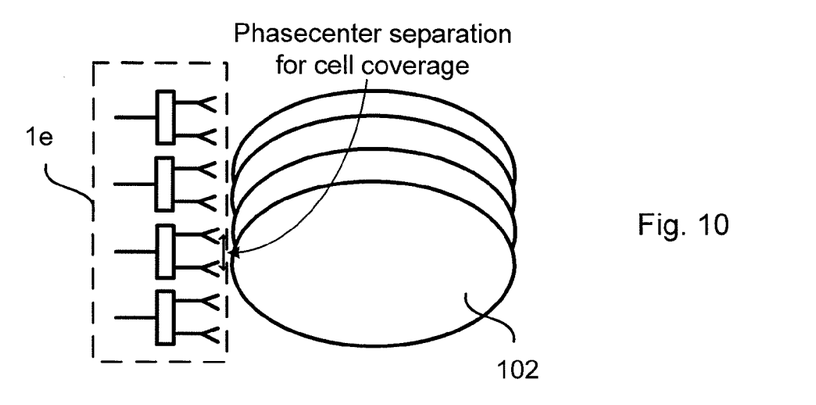
FIG. 10 schematically illustrates transmission of reference signals according to state of the art.
Figure 11:
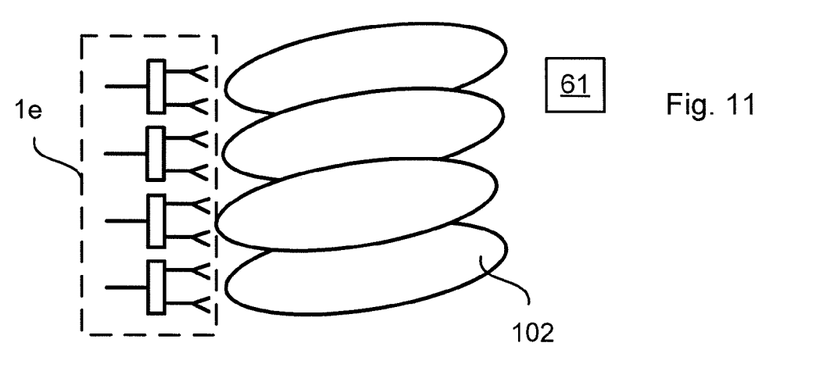
FIGS. 11 to 13 schematically illustrates transmission of reference signals using beam forming according to embodiments.

Assuming now without loss of generality that the antenna array 1 and antenna arrangement 40 are part of a network node 51 having a communications session with a wireless terminal 61. In the beginning of the communications session the reference signals are transmitted from the network node 51 over wide beams assuring that the wireless terminal 61 can be located in any angular direction and still be able to receive the reference signals. FIG. 10 schematically illustrates reference signals, one of which is identified at reference numeral 102, transmitted over beams covering the angular sector of the antenna array 1. This is an initial setting when the location of the wireless terminal 61 (or its angle of arrival, AOA) is unknown to the network node 51. As the accuracy in the direction (or AOA) of signals impinging the antenna array 1 of the network node 51 is improved the beams transmitting the reference signals are adjusted accordingly to cover a smaller region in the AOA direction. An example of how the phase center locations and beam shapes for the antenna ports transmitting the reference signals are changed as the AOA accuracy is improved is shown in FIG. 11. FIG. 11 schematically illustrates reference signals, one of which is identified at reference numeral 102, transmitted over beams which shape and phase center separation have been jointly optimized. In FIG. 11 is shown an example for a one dimensional antenna array 1 where all beams have the same power pattern. In the example of FIG. 11 the narrower beams (compared to those of FIG. 10) are formed by adapting the beam pattern as in step S108.

Step S108 enables adaptation of beam patterns for the reference signals with respect to beam width and beam direction (more generally the shape) as well as the phase center locations. Generally, the term "beam pattern" may correspond to a "power pattern" which thus only considers the power of the transmitted reference signals. In this case step S108 may comprise adapting also the radiation center of the transmitted reference signals. Alternatively, the term "beam pattern" may correspond to a "complex beam pattern" which relates to the complex-valued amplitude (and hence also the phase is included in the pattern) of the transmitted reference signals. In this case the radiation center of the transmitted reference signals is included in the phase of the beam pattern and hence the adaptation of the radiation center of the transmitted reference signals is thus inherently adapted in step S108. Further, the phase response of the beam pattern of the virtual antenna ports may need to be the same (besides a phase offset given by the different phase center locations).

Embodiments relating to further details of beam forming using an antenna array 1 will now be disclosed. Reference is also made to FIG. 9 illustrating methods for beam forming using an antenna array 1 according to further embodiments.

Transmitting one or several sets of reference signals over one or several sets of virtual antenna ports may be applied for different types of antenna arrays 1. The herein disclosed embodiments are thus applicable for different types of antenna arrays 1. For example, according to an embodiment the antenna array is an N1-by-N2 two-dimensional antenna array, where N1>1 and N2>1 are integers, see for example FIG. 2. However, according to other embodiments the antenna array 1 may have another shape, for example being a circular two-dimensional antenna array or a one dimensional antenna array.

There may be different ways to adapt the beam pattern in step S108. For example the beam pattern may be adapted to change beam width of the beam pattern. For example the beam pattern may be adapted to change beam pointing direction of the beam pattern. For example the beam pattern may be adapted to change phase center location or radiation center of the beam pattern. For example, port weights may be used to adapt the beam pattern. The method may thus comprise an optional step S108a of applying respective port weights to respective physical antenna ports of the antenna array 1. The processing unit 41 may be configured to perform step S108a.

The set of virtual antenna ports may, prior to the adapting in step S108, collectively cover the entire angular sector across which the antenna array 1 is configured to transmit. Alternatively, the set of virtual antenna ports may, prior to the adapting in step S108, collectively cover less than the entire angular sector.

As noted above, there may be different ways to acquire the angular information in step S106. In general terms, the reference signals transmitted in step S104 are intended to be received by a wireless transceiver device. Upon receiving the reference signals the wireless transceiver device may in return transmit channel state information back towards the device comprising the antenna array 1 and/or antenna arrangement 40.

For example, according to an embodiment, acquiring the angular information about the wireless transceiver device comprises an optional step S106a of receiving uplink data from the wireless transceiver device. The uplink data may be channel state information user data, or precoding matrix indicator (PMI) reports. The angular information may be acquired by performing measurements on the received uplink data. The angular information may comprise a direction (and/or the accuracy of this direction) in which the uplink data is received. The angular information may, in a step S106b, be determined based on the uplink data received in step S106a. The processing unit 41 may be configured to perform steps S106a and S106b. For example, in case of PMI reports the angular information may not primarily be estimated from the direction in which the PMI reports are received (although in principle this could be done as well), but on the actual content of the PMI report. In general terms, the PMI report may contain an index to the best precoding vector in the codebook. This index can be used to determine which was the best direction in the downlink transmission of the CSI-RS.

For example, according to an embodiment, acquiring the angular information about the wireless transceiver device comprises an optional step S106c of receiving location information specifying a current location of the wireless transceiver device. The location information may information from the global positioning system (GPS), such as GPS coordinates of the wireless transceiver device. The angular information may then be determined based on the location information (and the accuracy of this location information), step S106d. The processing unit 41 may be configured to perform steps S106c and S106d.

For example, according to an embodiment, acquiring angular information about the wireless transceiver device comprises performing both steps S106a and S106c and hence the angular information may be determined based on a combination of steps S106b and S106d.

For example, the channel information may be a precoding matrix indicator (PMI) report. The network node 51 may thus be configured to receive PMI reports in step S106a. Based on, for example, such PMI reports from the radio transceiver device receiving the reference signals transmitted in S104, beam forming may be performed using the whole antenna array. For example, PMI reports from a wireless terminal 61 may be used to determine the direction to the dominant propagation path to this wireless terminal 61. This direction may then be used to determine port weights as in step S108a that adapts the beam forming in step S106 to point in this direction.

The antenna array 1 and/or antenna arrangement 40 may transmit data to the wireless transceiver device. Particularly, data in the form of reference signals may be transmitted using the beam pattern determined in step S108. Thus, according to an embodiment the method comprises an optional step S110 of transmitting data to the wireless transceiver device using beam forming over multiple virtual antenna ports, each having the adapted beam pattern. The processing unit 41 may be configured to cause the antenna array 1 and/or antenna arrangement 40 to perform step S110.

The reference signals may be channel state information reference signals (CSI-RS). The reference signals may thus be pilot signals for obtaining channel state information from wireless transceiver devices. As noted above, a network node 51 may comprise a two dimensional antenna arrangement 1 as herein disclosed. The network node 51 may thus be configured to transmit CSI-RS as outlined in step S104.

The reference signals may be sounding reference signals (SRS). As noted above, a wireless terminal 61 may comprise a two dimensional antenna arrangement 1 as herein disclosed. The wireless terminal 61 may thus be configured to transmit SRS as outlined in step S104.

Figure 12:
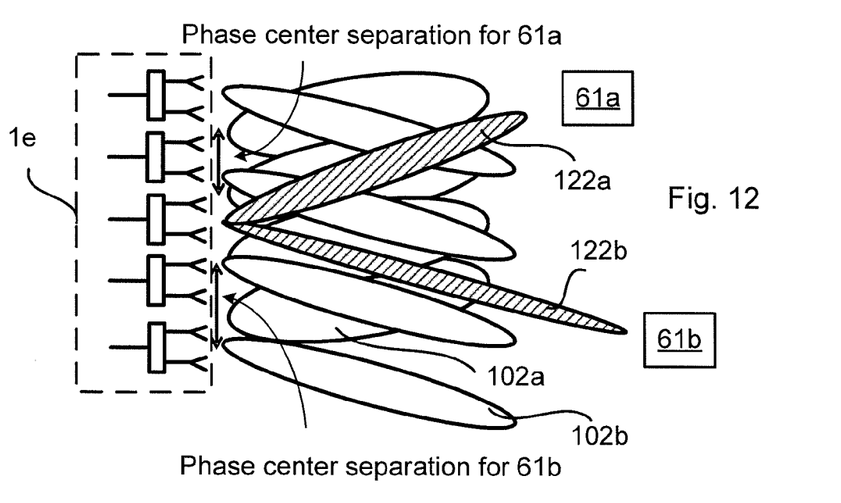

As noted above, reference signals may be transmitted to more than one wireless transceiver device. In case of several wireless transceiver devices the beams for transmitting reference signals can be adapted to each wireless transceiver device, which may use different sets of reference signals, as is illustrated in FIG. 12. Thus, according to an embodiment the method comprises an optional step S102a of determining at least one further set of virtual antenna ports by respective further mappings of physical antenna ports of the antenna array. Each at least one further set of virtual antenna ports defines a respective beam pattern. Each set of virtual antenna ports is associated with a respective set of reference signals for channel state information. In more detail FIG. 12 schematically illustrates transmission of reference signals 102a, 102b over antenna beam ports adapted on a per wireless transceiver device basis for two wireless terminals 61a and 61b. Both beam shapes and phase centers may be defined based on the desired coverage for each set of reference signals. This allows for even narrower beams for data transmission. The beams used for data transmission (as transmitted in step S110) are also indicated in FIG. 12 by means of hatched areas 122a, 122b.

As noted above, the beam former 1a-c of FIG. 3 may be configured to receive at least two sets of user data, beam forming weights for the user data, and beam forming weights for reference signals. Further details relating thereto will now be disclosed. According to embodiments multiple sets of reference signals, corresponding to multiple CSI-RS processes, may simultaneously be transmitted from the antenna array 1. The multiple sets of reference signals may be used for increasing the number of antenna ports that are used for CSI estimation. This may improve the angular resolution (and/or yielding dense channel estimations) in the CSI estimation and thereby make it useful to use a correspondingly increased number of antenna ports for the beam forming of the user data, which in turn may improve the beam forming gain.

Therefore, according to an embodiment the method further comprises an optional step S104a of simultaneously transmitting the first set of reference signals for acquiring channel state information over the first set of virtual antenna ports, and the at least one further set of reference signals for acquiring channel state information over the at least one further set of virtual antenna ports.

In this respect, multiple CSI-RS processes in LTE are not transmitted completely simultaneously in completely the same frequency. Some CSI-RS signals are transmitted in different physical resource elements, i.e., using different subcarriers and orthogonal frequency-division multiplexing (OFDM) symbols. However, the multiple CSI-RS processes are transmitted in the same physical resource block (consisting of 12 subcarriers and 7 OFDM symbols) so at this level of granularity in the time-frequency grid they are regarded as transmitted simultaneously in the same frequency band. Thus, when transmitting simultaneously at the same frequency in LTE is meant in the same physical resource blocks.

Each set of virtual antenna ports may be associated with a specific wireless transceiver device or group of wireless transceiver devices.

The first set of reference signals may be transmitted in a first frequency subband, and the second set of reference signals may be transmitted in a second frequency subband. The first frequency subband may be different from the second frequency subband.

One particular embodiment incorporating features and steps as disclosed above will now be disclosed. This particular embodiment relates to a method as performed by the network node 51 and hence the radio transceiver device is embodied as the wireless terminal 61.

S202: The network node 51 defines a set of virtual antenna ports which covers the entire angular coverage of the antenna array 1 and where the phase center separation is such that the full set, or potentially a select fraction, of the beams defined by the codebook span the angular coverage. Performing S202 may include performing any of steps S102 and S102a.

S204: As the accuracy in the direction, or rather the angle of arrival, for a specific wireless transceiver device or groups of wireless transceiver devices improves network node 51 reduces the angular coverage of the beams transmitting reference signals used for acquire channel state information of this specific wireless transceiver device or groups of wireless transceiver devices and adjusts the phase centers accordingly such that the beams cover the desired area and the resolution offered by the codebook is fully utilized. Performing S202 may include performing any of steps S104, S104a, S104b, S106, S106a, S106b, S106c, S106d, S108, and S108a.

Figure 13:
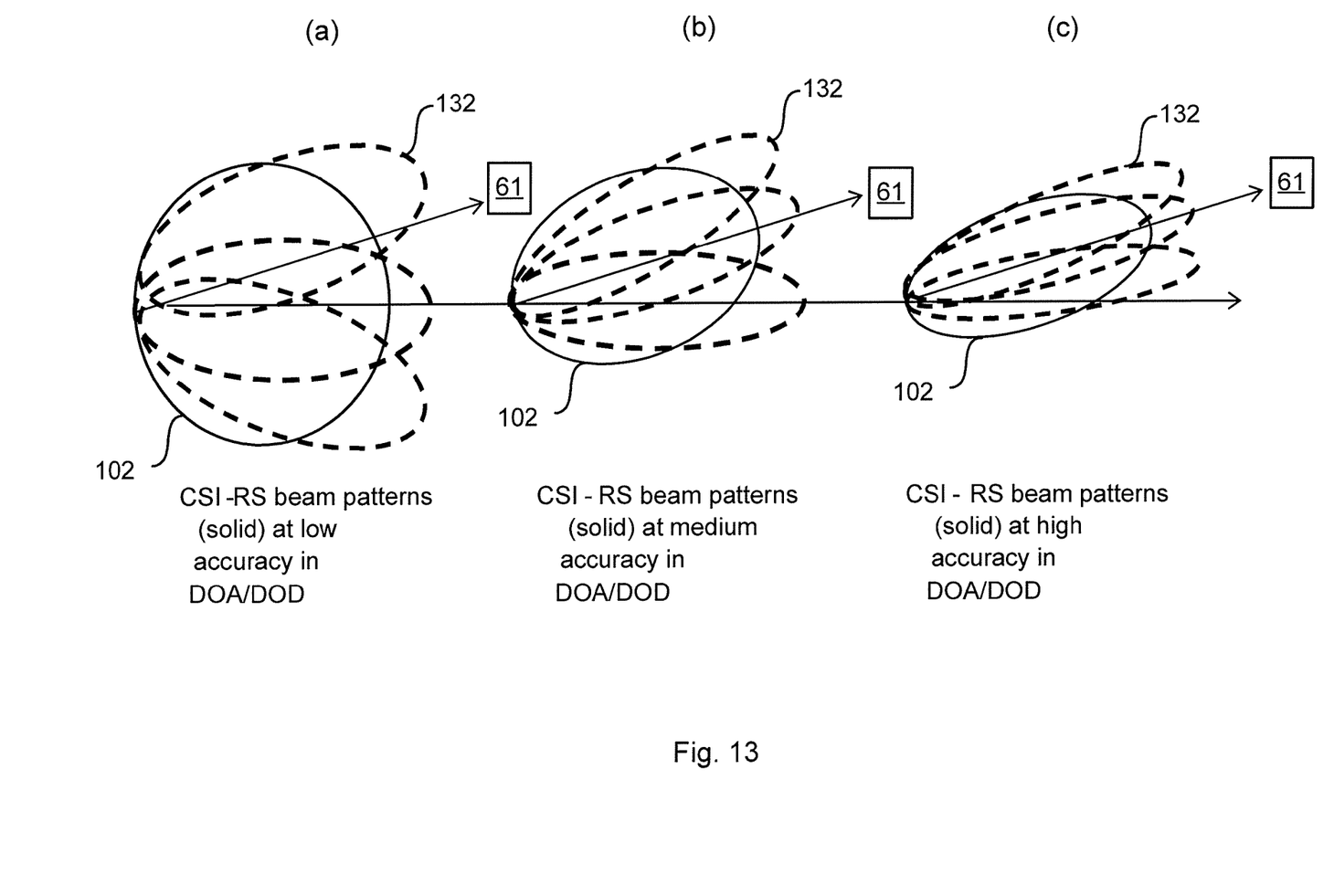

FIG. 13 gives a simplified illustration of applying methods for beam forming as herein disclosed. More particularly, FIG. 13 provides a schematic illustration of beam patterns for transmitting reference signals (solid, 102) and corresponding code book beam patterns (dashed, 132) to a wireless terminal 61 for different levels of accuracy in angular information according to three scenarios. In the left-most example of FIG. 13 a scenario (a) with poor accuracy, for example when a wireless link is established, is illustrated. In the center example of FIG. 13 a scenario (b) with medium accuracy is illustrated, having narrower beams than in the left-most scenario resulting from beam forming as herein disclosed having been performed. In the right-most example of FIG. 13 a scenario (c) with high accuracy is illustrated, having even narrower beams than in the center scenario. The right-most example may represent a scenario where further angular information may have been acquired, for example due to data having been transmitted on the wireless link, as in step S110.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For examples, although relating to LTE releases 10 and 11, the herein disclosed embodiments may also be applicable to earlier LTE releases by using a similar transmission scheme for the cell-specific reference signals and, e.g., transmission mode 7 (TM7). For examples, although using LTE specific terminology, the herein disclosed embodiments may also be applicable to communications networks not based on LTE, mutatis mutandis.

The invention claimed is:

1. A method for beam forming using an antenna array configured to transmit across an angular sector, comprising the steps of:
   determining a first set of virtual antenna ports by a mapping of physical antenna ports of the antenna array, the first set of virtual antenna ports defining a beam pattern;
   transmitting a first set of reference signals for acquiring channel state information over the first set of virtual antenna ports;
   acquiring angular information about a wireless transceiver device receiving the transmitted first set of reference signals; and
   adapting the beam pattern for the first set of reference signals based on at least one or more of an accuracy of the angular information and the angular information itself.

2. The method according to claim 1, wherein the beam pattern is adapted to change a beam width of the beam pattern.

3. The method according to claim 1, wherein the bead pattern is adapted to change a beam pointing direction of the beam pattern.

4. The method according to claim 1, wherein the beam pattern is adapted to change at least one of a phase center location and a radiation center of the beam pattern.

5. The method according to claim 1, wherein adapting the beam pattern comprises:
   applying respective port weights to respective physical antenna ports of the antenna array.

6. The method according to claim 1, further comprising:
   determining at least one further set of virtual antenna ports by respective further mappings of physical antenna ports of the antenna array, each at least one further set of virtual antenna ports defining a respective beam pattern, and wherein each set of virtual antenna ports is associated with a respective set of reference signals for channel state information.

7. The method according to claim 6, further comprising:
   simultaneously transmitting the first set of reference signals for acquiring channel state information over the first set of virtual antenna ports, and the respective set of reference signals for acquiring channel state information over the at least one further set of virtual antenna ports.

8. The method according to claim 7, wherein the first set of reference signals are transmitted in a first frequency subband, and wherein the second set of reference signals are transmitted in a second frequency subband.

9. The method according to claim 7, wherein each set of virtual antenna ports is associated with at least one of a specific wireless transceiver device and a group of wireless transceiver devices.

10. The method according to claim 1, further comprising:
    transmitting data to the wireless transceiver device using beam forming over multiple teal antenna ports, each having the adapted beam pattern.

11. The method according to claim 1, wherein collectively the set of virtual antenna ports prior to the adapting covers the entirety of the angular sector.

12. The method according to claim 1, wherein collectively the set of virtual antenna ports prior to the adapting covers less than the entirety of the angular sector.

13. The method according to claim 1, wherein the antenna array is an N1-by-N2 two-dimensional antenna array, where N1>1 and N2>1.

14. The method according to claim 1, wherein the reference signals are channel state information reference signals, CSI-RS.

15. The method according to claim 1, wherein the reference signals are sounding reference signals, SRS.

16. The method according to claim 1, wherein acquiring the angular information about the wireless transceiver device comprises:
receiving uplink data from the wireless transceiver device; and
determining the angular information based on the uplink data.

17. The method according to claim 1, wherein acquiring the angular information about the wireless transceiver device comprises:
receiving location information specifying a current location of the wireless transceiver device; and
determining the angular information based on the location information.

18. An antenna arrangement for beam forming using an antenna array configured to transmit across an angular sector, the antenna arrangement comprising a processing unit configured to:
determine a first set of virtual antenna ports by a mapping of physical antenna ports of the antenna array, the first set of virtual antenna ports defining a beam pattern;
cause the antenna array to transmit a first set of reference signals for acquiring channel state information over the first set of virtual antenna ports;
acquire angular information about a wireless transceiver device receiving the transmitted first set of reference signals; and
adapt the beam pattern for the first set of reference signals based on at least one or more of an accuracy of the angular information and the angular information itself.

19. The antenna arrangement according to claim 18, wherein the processing unit further is configured to:
apply respective port weights to respective physical antenna ports of the antenna array.

20. The antenna arrangement according to claim 18, wherein the processing unit further is configured to:
determine at least one further set of virtual antenna ports by respective further mappings of physical antenna ports of the antenna array, each at least one further set of virtual antenna ports defining a respective beam pattern, and wherein each set of virtual antenna ports is associated with a respective set of reference signals for channel state information.

21. The antenna arrangement according to claim 20, wherein the processing unit further is configured to cause the antenna array to:
simultaneously transmit the first set of reference signals for acquiring channel state information over the first set of virtual antenna ports, and the respective set of reference signals for acquiring channel state information over the at least one further set of virtual antenna ports.

22. The antenna arrangement according to claim 18, wherein the processing unit further is configured to:
transmit data to the wireless transceiver device using beam forming over multiple virtual antenna ports, each having the adapted beam pattern.

23. The antenna arrangement according to claim 18, wherein the processing unit further is configured to:
receive uplink data from the wireless transceiver device; and
determine the angular information based on the uplink data.

24. The antenna arrangement according to claim 18, wherein the processing unit further is configured to:
receive location information specifying a current location of the wireless transceiver device; and
determine the angular information based on the location information.

25. A network node comprising an antenna arrangement according to claim 18.

26. A wireless terminal comprising an antenna arrangement according to claim 18.

27. A non-transitory computer readable medium encoded with a computer program for beam forming using an antenna array configured to transmit across an angular sector, the computer program comprising computer program code which, when run on a processing unit, causes the processing unit to:
determine a first set of virtual antenna ports by a mapping of physical antenna ports of the antenna array, the first set of virtual antenna ports defining a beam pattern;
cause the antenna array to transmit a first set of reference signals for acquiring channel state information over the first set of virtual antenna ports;
acquire angular information about a wireless transceiver device receiving the transmitted first set of reference signals; and
adapt the beam pattern for the first set of reference signals based on at least one or more of an accuracy of the angular information and the angular information itself.

* * * * *

UNITED STATES PATENT AND TRADEMARK OFFICE
CERTIFICATE OF CORRECTION

PATENT NO. : 9,544,036 B2
APPLICATION NO. : 14/358020
DATED : January 10, 2017
INVENTOR(S) : Petersson et al.

It is certified that error appears in the above-identified patent and that said Letters Patent is hereby corrected as shown below:

On the Title Page

In Item (12), under "United States Patent", in Column 1, Line 1, delete "Peterson" and insert -- Petersson --, therefor.

In Item (72), under "Inventors", in Column 1, Line 1, delete "Peterson," and insert -- Petersson, --, therefor.

On Page 2, in Item (56), under "U.S. PATENT DOCUMENTS", in Column 1, Line 2, delete "Lee" and insert -- Lee et al. --, therefor.

In the Drawings

In Fig. 1, Sheet 1 of 5, delete "basedand" and insert -- baseband --, therefor.

In the Specification

In Column 1, Line 61, delete "state" and insert -- state information --, therefor.

In Column 3, Line 63, delete "embodiment; and" and insert -- embodiment; --, therefor.

In Column 7, Line 32, delete "(see," and insert -- (see --, therefor.

In Column 8, Line 51, delete "example" and insert -- example, --, therefor.

In Column 8, Line 52, delete "example" and insert -- example, --, therefor.

In Column 8, Line 54, delete "example" and insert -- example, --, therefor.

Signed and Sealed this
Fifth Day of September, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,544,036 B2

In Column 10, Lines 5-6, delete "antenna arrangement 1" and insert -- antenna arrangement 40 --, therefor.

In Column 10, Line 10, delete "antenna arrangement 1" and insert -- antenna arrangement 40 --, therefor.

In the Claims

In Column 12, Line 22, in Claim 3, delete "bead" and insert -- beam --, therefor.

In Column 12, Line 57, in Claim 10, delete "teal" and insert -- virtual --, therefor.